United States Patent

Healy et al.

Patent Number: 5,951,935
Date of Patent: Sep. 14, 1999

[54] METHOD FOR MAKING SOCK LINER HAVING RESILIENT PADS THEREIN

[75] Inventors: John Healy, Madbury, N.H.; Mary-Patricia Adamo, Wakefield, Mass.

[73] Assignee: Converse Inc., North Reading, Mass.

[21] Appl. No.: 08/919,414

[22] Filed: Aug. 27, 1997

[51] Int. Cl.⁶ .................................................. B29C 44/04
[52] U.S. Cl. .......................... 264/244; 156/247; 156/249; 156/300; 264/46.4; 264/255; 264/259; 264/267
[58] Field of Search .................. 264/46.4, 46.6, 264/255, 244, 259, 267; 156/300, 247, 249

[56] References Cited

U.S. PATENT DOCUMENTS

| | | |
|---|---|---|
| 1,741,419 | 12/1929 | Jones . |
| 2,581,864 | 1/1952 | Kaufmann, Jr. . |
| 3,247,538 | 4/1966 | Purtell . |
| 4,408,402 | 10/1983 | Looney . |
| 4,674,204 | 6/1987 | Sullivan et al. . |
| 4,777,739 | 10/1988 | Hiles . |
| 4,793,078 | 12/1988 | Andrews . |
| 4,910,886 | 3/1990 | Sullivan et al. . |
| 4,932,141 | 6/1990 | Hones . |
| 5,170,572 | 12/1992 | Kantro . |
| 5,308,420 | 5/1994 | Yang ........................... 264/46.6 |
| 5,438,768 | 8/1995 | Bauerfeind . |
| 5,503,786 | 4/1996 | Yang ........................... 264/46.4 |
| 5,517,770 | 5/1996 | Martin et al. . |
| 5,542,196 | 8/1996 | Kantro . |
| 5,547,620 | 8/1996 | Guiotto ........................... 264/46.6 |

*Primary Examiner*—Allan R. Kuhns
*Attorney, Agent, or Firm*—Howell & Haferkamp, L.C.

[57] ABSTRACT

A method of making a sock liner for insertion in footwear comprising providing a sock liner member having a cavity in an underside thereof, filling the cavity with a fluid which is curable to an elastomeric condition, and allowing the fluid to cure to the elastomeric condition.

13 Claims, 2 Drawing Sheets

METHOD FOR MAKING SOCK LINER HAVING RESILIENT PADS THEREIN

BACKGROUND OF THE INVENTION

This invention relates to methods for making sock liners for insertion into shoes and, more particularly, to methods for making sock liners for insertion into athletic shoes.

A typical athletic shoe includes a midsole, an upper secured to the midsole and configured for covering a wearer's foot, an outsole secured to the underside of the midsole, and a sock liner on the upper side of the midsole. The sock liner is generally made of a resilient foam material such as ethylene vinyl acetate (EVA) or polyurethane (PU). Some sock liners have resilient inserts encapsulated by the foam material. These inserts comprise preformed pads. The pads are placed into a mold and then a liquid material (e.g., urethane) is poured into the mold to form the urethane foam around the inserts.

A disadvantage of such prior art method of making sock liners is that the inserts tend to shift as the liquid material is poured into the mold.

SUMMARY OF THE INVENTION

Among the several objects of the present invention may be noted the provision of an improved method of making a sock liner having a resilient foam body and at least one resilient pad within the foam body; the provision of such a method which prevents the pad from shifting during manufacture of the sock liner; the provision of such a method in which the sock liner so made has excellent cushioning, shock absorption, and energy return; and the provision of such a method of making a sock liner in a cost effective manner.

In general, a method of the present invention is for making a sock liner for insertion in footwear. The method comprises providing a sock liner member having a cavity in an underside thereof, filling the cavity with a fluid which is curable to an elastomeric condition, and allowing the fluid to cure to the elastomeric condition.

Another aspect of the present invention is a method of making a shoe. The method comprises attaching a midsole to an upper, providing a sock liner member having a cavity in an underside thereof, filling the cavity with a fluid which is curable to an elastomeric condition, allowing the fluid to cure to the elastomeric condition, and placing the sock liner member onto an upper surface of the midsole.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
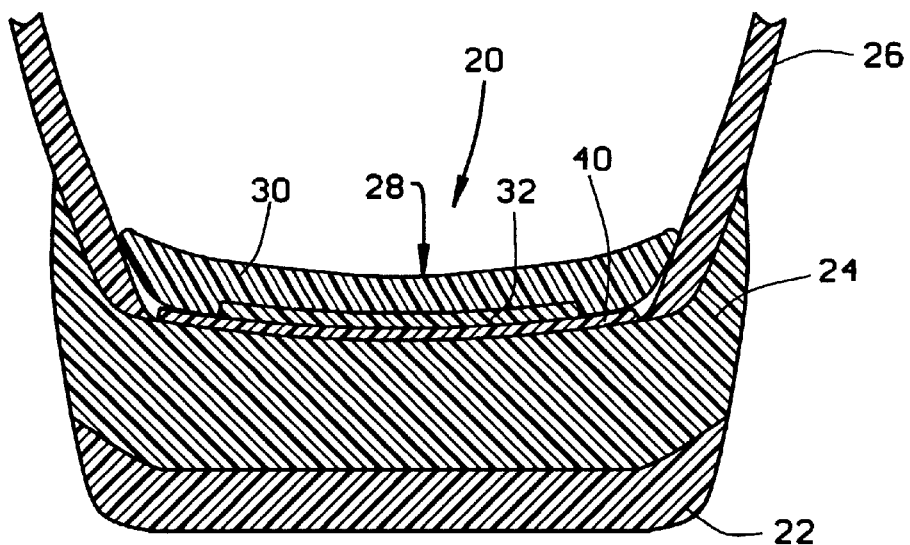
FIG. 1 is a schematic representation of a fragmented vertical cross-sectional view of a shoe constructed in accordance with the present inventive method, the cross-section being taken generally through the heel of the shoe.
Figure 2:
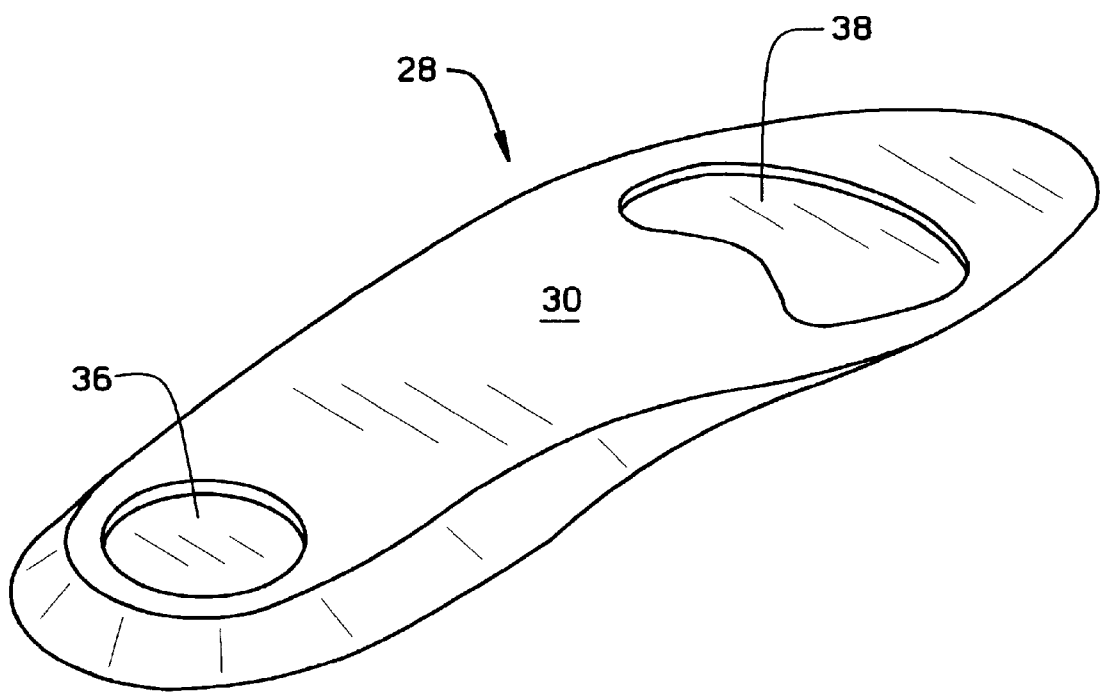
FIG. 2 is an inverted, perspective view of a sock liner member used in the construction of the shoe of FIG. 1, the sock liner having heel and forefoot cavities in its underside.
Figure 3:
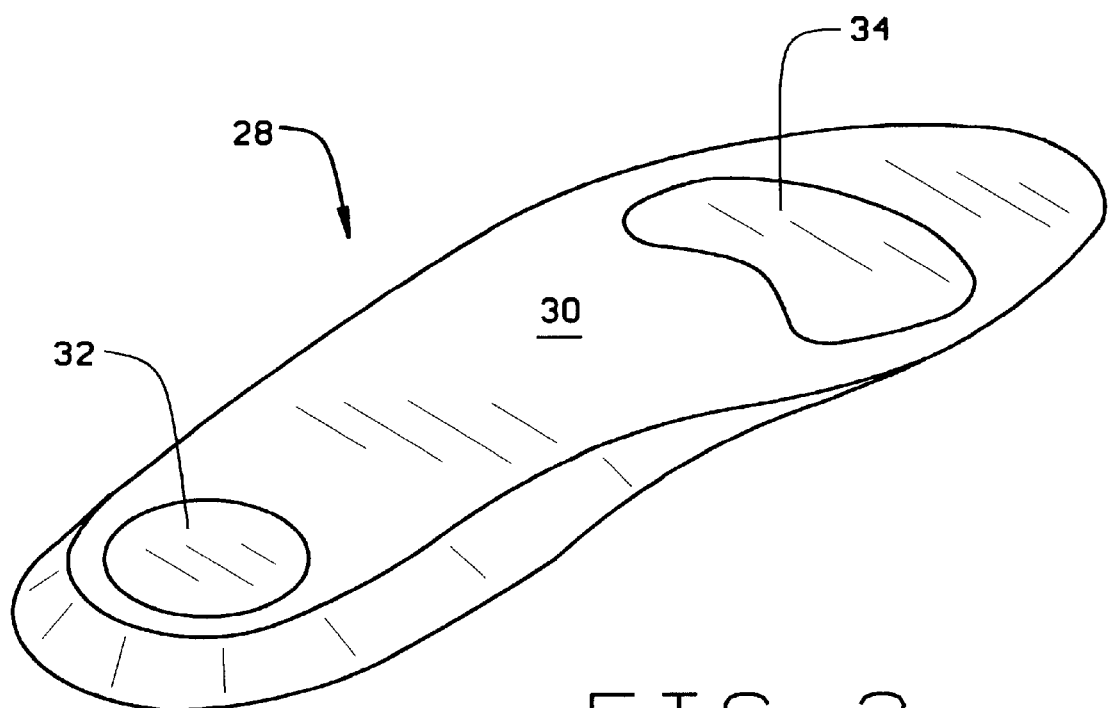
FIG. 3 is an inverted, perspective view of the sock liner member of FIG. 2 with the cavities filled with a curable polyurethane.

Referring now to the drawings, and first more particularly to FIG. 1, a shoe constructed in accordance with the method of the present invention is indicated in its entirety by the reference numeral 20. The shoe 20 is preferably an athletic shoe (e.g., a running shoe or basketball shoe) and includes an outsole, generally indicated at 22, a midsole, generally indicated at 24, an upper, generally indicated at 26, and a sock liner, generally indicated at 28. Preferably, the outsole 22 and midsole 24 are made of conventional outsole and midsole materials. In particular, the outsole 22 is preferably of a durable material, such as carbon rubber, and the midsole 24 is preferably of a cushioning material, such as foam polyurethane or foam ethylene vinyl acetate. The sock liner 28 includes a sock liner member 30, a heel pad 32, and a forefoot pad 34.

The sock liner member 30 is preferably formed of a foam polyurethane or foam ethylene vinyl acetate. It is preferably formed with a heel cavity 36 and forefoot cavity 38 in its underside. The heel pad 32 is within the heel cavity 36 and the forefoot pad 34 is within the forefoot cavity 38. The cavities 36, 38 are each defined by a cavity wall and a cavity ceiling. Each cavity wall is preferably a closed curve and is spaced at all points from the periphery of the sock liner member. In other words the cavity wall does not merge with or intersect the periphery of the sock liner member. Although the cavities are shown as having a particular shape and being in a particular location, it is to be understood that they could be of different shapes and be in different locations without departing from the scope of this invention. Also, the cavity ceilings are shown as being generally flat. However, it is to be understood that the cavity ceilings could be of other shapes without departing from the scope of this invention.

To form the pads 32, 34 the heel and forefoot cavities 36, 38 are filled with a polyurethane fluid substance which is curable to an elastomeric solid condition, i.e., it becomes solid to a predetermined firmness and does not flow. The polyurethane substance is preferably of two component fluids which are mixed together and then injected into the cavities 36, 38 of the sock liner member 30. Preferably, the two component fluids are selected such that the mixture cures within fifteen minutes into the elastomeric pads 32, 34 having a durometer hardness different from that of the sock liner member 30. One of the two component fluids is preferably a Polyether Polyol, and the other is a plasticizer with Isocyanate Terminated Prepolymers. These fluids are commercially available from Synair Corporation of Chattanooga, Tenn.

The two component fluids are injected into the cavities 36, 38 via a metered mixing and dispensing mechanism (not shown). Preferably, the dispensing mechanism is of the type commercially available from Ashby Cross of Tops Field, Mass. The meter mixing and dispensing equipment includes two separate tanks (not shown). One tank contains the liquid polyol and the other tank contains the liquid plasticizer. The liquids are drawn from their tanks in metered amounts, mixed via a mixing nozzle and then directly injected into the cavities of the sock liner member 30. The combination of the two raw components when dispensed through the mixing nozzle has a viscosity comparable to that of motor oil (e.g., 800–1100 centipoise). Prior to curing therefore, the fluid substance is a liquid, flows easily into the cavities 36, 38, and can conform exactly to the three dimensional form of the cavity. Upon curing, the formed polyurethane pads 32, 34 preferably have a durometer hardness in the range of 25–65

Shore 000 scale, and more preferably have a durometer hardness of approximately 50 Shore 000 scale. The exact material properties of the polyurethane pads 32, 34 can be varied by changing the mixing ratio of the polyol and plasticizer. The sock liner member 30 preferably has a durometer hardness in the range of 45–65 Shore 00 scale. The predominant property that is changed by varying the ratio is hardness. Although the pads 32, 34 have been described as preferably being less resilient (i.e., softer) than the sock liner member 30, it is to be understood that the formed pads could be more resilient (i.e., harder) than the midsole body without departing from the scope of this invention.

Preferably, the formed resilient pads 32, 34 remain tacky even after curing so that they bond to the sock liner member 30. This bond resists shifting of the pads 32, 34 within the shoe 20. Thus, the tackiness of the pads maintains effectiveness of the pads and comfort of the shoe 20 by preventing a change in orientation of the pads, and also prevents shoe squeak.

Figure 4:
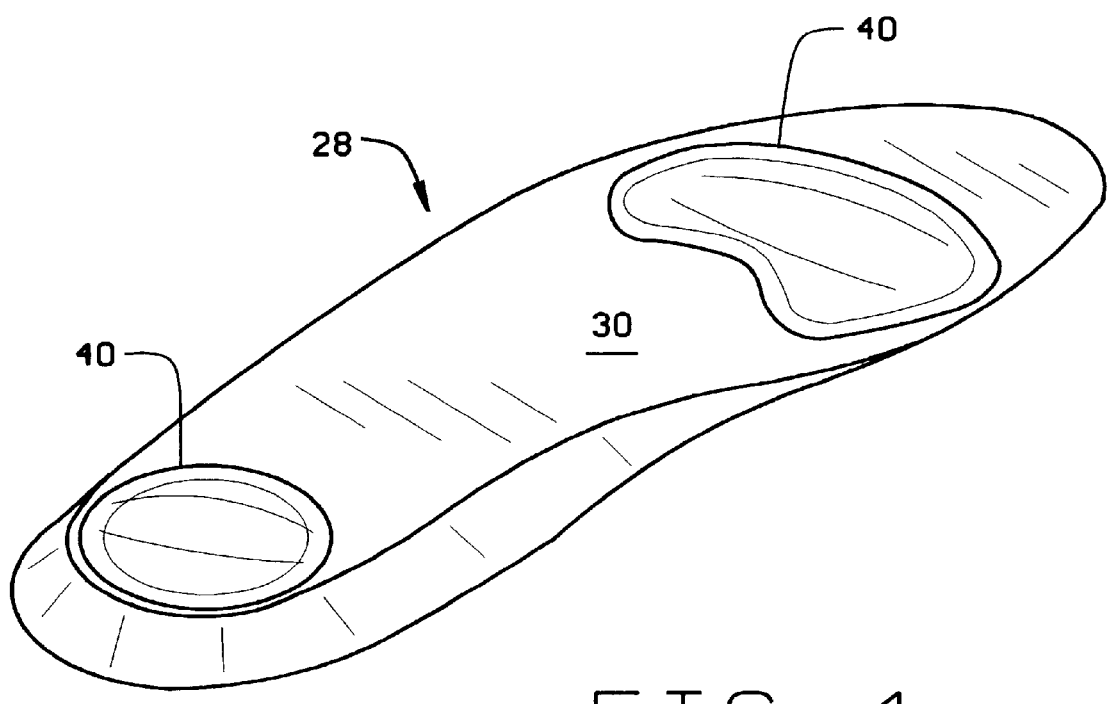
FIG. 4 is an inverted, perspective view of the sock liner member of FIG. 3 with a flexible sheet covering the cavities of the sock liner member.

Referring now to FIG. 4, a flexible, polymeric sheet 40 is preferably placed against the underside of the sock liner member 30 after the fluid polyurethane has cured to form the heel pads 32 but before the sock liner 28 is placed onto the upper surface of the midsole 24. Preferably, the sheet 40 completely covers the tacky pads 32, 34. In some uses of the sock liner 28, it is desirable to permanently bond the polymeric sheet 40 directly to the sock liner member 30 and insert the sock liner 28 with the attached sheet into the shoe. When used in this manner, the sheet 40 prevents the tacky pads 32, 34 from adhering to the upper surface of the midsole 24.

In other uses of the sock liner 28, it is desirable to remove the sheet 40 from the sock liner 28 before placing the sock liner onto the midsole 24. When used in this manner, the sheet 40 acts as a backing layer to prevent the tacky pads 32, 34 of the sock liner from undesirably adhering to other objects (e.g, other sock liners) before the sock liner is placed against the midsole 24. When it is desired to place the sock liner 28 on the midsole 24, the sheet 40 (backing layer) is peeled off the sock liner so that the pads 32, 34 adhere to the midsole. When used as a backing layer, then the sheet 40 is adhered to the sock liner 28 only via the tacky pads 32, 34 and not via the lock liner member 30. Also, preferably, when used as a backing layer, the sheet is either made of or coated with a suitable material (e.g., wax) to somewhat repel or reduce the adhesive hold of the pads against backing layer so that the backing layer may be easily removed.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of making a sock liner for insertion in footwear, the method comprising:
    providing a sock liner member having a cavity in an underside thereof by introducing a first fluid into a mold, and allowing the first fluid to cure to a first elastomeric condition to form the sock liner member;
    introducing a second fluid into the cavity, the second fluid being curable to a second elastomeric condition different than the first elastomeric condition; and
    allowing the second fluid to cure to said second elastomeric condition.

2. A method as set forth in claim 1 wherein the step of filling the cavity with a fluid comprises filling the cavity with a curable polyurethane.

3. A method as set forth in claim 2 wherein the step of providing the sock liner member comprises forming the sock liner member in a mold.

4. A method as set forth in claim 1, wherein the second fluid is curable to a solid polyurethane having a durometer hardness of between about 35 Shore 000 and 65 Shore 000.

5. A method as set forth in claim 1 wherein the second fluid is curable to a solid polyurethane having a durometer hardness of approximately 50 Shore 000.

6. A method as set forth in claim 1 further comprising bonding a flexible sheet to the underside of the sock liner member after filling of the cavity with the curable fluid, the flexible sheet covering the cavity.

7. A method of making a shoe comprising:
    attaching a midsole to an upper;
    providing a sock liner member having a cavity in an underside thereof by introducing a first fluid into a mold, and allowing the first fluid to cure to a first elastomeric condition to form the sock liner member;
    introducing a second fluid into the cavity, the second fluid being curable to a second elastomeric condition different than the first elastomeric condition;
    allowing the second fluid to cure to said second elastomeric condition to form an elastomeric pad; and
    placing the sock liner member onto an upper surface of the midsole,
    wherein the step of allowing the second fluid to cure to said second elastomeric condition is performed prior to the step of placing the sock liner member onto the upper surface of the midsole.

8. A method as set forth in claim 7 wherein the step of filling the cavity with a fluid comprises filling the cavity with a curable polyurethane.

9. A method as set forth in claim 8 wherein the step of providing the sock liner member comprises forming the sock liner member in a mold.

10. A method as set forth in claim 7 wherein the second fluid is curable to a solid polyurethane having a durometer hardness of between about 35 Shore 000 and 65 Shore 000.

11. A method as set forth in claim 7 further comprising bonding a flexible sheet to the underside of the sock liner member after filling of the cavity with the curable fluid, the flexible sheet covering the cavity.

12. A method of making a shoe comprising:
    attaching a midsole to an upper;
    providing a sock liner member having a cavity in an underside thereof;
    filling the cavity with a fluid which is curable to an elastomeric condition;
    allowing the fluid to cure to said elastomeric condition to form an elastomeric pad;
    placing the sock liner member onto an upper surface of the midsole; and
    placing a flexible sheet against the elastomeric pad, the elastomeric pad being sufficiently tacky to hold the flexible sheet against the elastomeric pad.

13. A method as set forth in claim 12 further comprising removing the flexible sheet prior to the step of placing the sock liner member onto the upper surface of the midsole.

* * * * *